(12) United States Patent
Ye et al.

(10) Patent No.: US 10,547,835 B2
(45) Date of Patent: Jan. 28, 2020

(54) TECHNIQUES FOR SIGNALING PREDICTION WEIGHTS IN VIDEO CODING (71) Applicant: TENCENT AMERICA LLC, Palo Alto, CA (US)

(72) Inventors: Jing Ye, San Jose, CA (US); Shan Liu, San Diego, CA (US); Stephan Wenger, Hillsborough, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 16/233,979

(22) Filed: Dec. 27, 2018

(65) Prior Publication Data

US 2019/0394459 A1 Dec. 26, 2019

Related U.S. Application Data (60) Provisional application No. 62/688,896, filed on Jun. 22, 2018.

(51) Int. Cl.
*H04N 19/105* (2014.01)
*H04N 19/176* (2014.01)
*H04N 19/44* (2014.01)
*H04N 19/132* (2014.01)

(52) U.S. Cl.
CPC ......... *H04N 19/105* (2014.11); *H04N 19/132* (2014.11); *H04N 19/176* (2014.11); *H04N 19/44* (2014.11)

(58) Field of Classification Search
CPC ....... G01N 21/8806; G01N 2021/8838; H04N 5/2354
See application file for complete search history.

(56) References Cited

U.S. PATENT DOCUMENTS

2018/0295385 A1* 10/2018 Alshin ................ H04N 19/176

* cited by examiner

*Primary Examiner* — James M Pontius
(74) *Attorney, Agent, or Firm* — Sughrue Mion, PLLC (57) ABSTRACT A method for predicting a weighting factor to be applied to at least one sample in a bi-predicted Prediction Unit (PU) under reconstruction for decoding a coded video sequence includes reconstructing, from the coded video sequence, a previous weighting factor applied to a previously reconstructed PU; deriving the weighting factor to be applied to the at least one sample in the bi-predicted PU under reconstruction based on the previous weighting factor; and weighting a sample value of a sample in the bi-predicted PU under reconstruction by applying the weighting factor.

18 Claims, 9 Drawing Sheets

FIG. 9
Computer System 900

TECHNIQUES FOR SIGNALING PREDICTION WEIGHTS IN VIDEO CODING

CROSS-REFERENCE TO RELATED APPLICATION

This application claims priority under 35 U.S.C. § 119 to U.S. Application No. 62/688,896, filed on Jun. 22, 2018, in the United States Patent & Trademark Office, the disclosure of which is incorporated herein by reference in its entirety.

FIELD

The present disclosure relates to video coding and decoding, and more specifically, to the prediction of weighting factors in bi- and multi-prediction for the prediction of samples.

BACKGROUND

Video coding and decoding using inter-picture prediction with motion compensation has been known for decades. Uncompressed digital video can consist of a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GByte of storage space.

One purpose of video coding and decoding can be the reduction of redundancy in the input video signal, through compression. Compression can help reducing aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signal is small enough to make the reconstructed signal useful for the intended application. In the case of video, lossy compression is widely employed. The amount of distortion tolerated depends on the application; for example, users of certain consumer streaming applications may tolerate higher distortion than users of television contribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding, some of which will be introduced below.

Bi-Prediction can relate to techniques where a prediction unit (PU), such as a block of samples, can be predicted from two motion compensated blocks of samples of two or more reference pictures. Bi-prediction was first introduced into video coding standards in MPEG-1 (formally: ISO/IEC 11172-part 2) and has been included in other video coding technologies and standards such as MPEG-2 part 2, H.264 and H.265 as well.

During the reconstruction of a sample of a bi-predicted PU, motion compensated and interpolated input samples from each reference block can be multiplied by a weighting factor that can be different for each reference block, and such weighted sample values of the two reference blocks can be added to generate the sample under reconstruction. Such sample can be processed further by mechanisms such as loop filtering.

In MPEG-1 and MPEG-2, the weighting factors can be determined based on the relative temporal distance between the picture to which the PU under reconstruction belongs to, and the two reference pictures. This was possible because, in MPEG-1 and MPEG-2, one of the two reference I or P pictures was in the "past", and the other in the "future" (in terms of presentation order) of the B-picture under reconstruction, and because in MPEG-1 and MPEG-2, there was a well-defined timing relationship established for any picture under reconstruction in relation to its reference pictures.

Starting with H.264, the reference picture selection concepts for bi-predicted pictures were relaxed such that the reference pictures only needed to be earlier in decoding order, but not in presentation order. Further, the notion of time was also relaxed in that neither H.264 nor H.265 require a constrained/fixed picture interval in the time domain. Therefore, a decoder cannot calculate weighting factors any more based on the timing information available in the bitstream. Instead, H.264 and H.265 include a "default" of 0.5 as the weighting factor for the reference samples of a bi-predicted picture. This default can be overwritten by a syntax available in the slice header known as pre_weight_table( ). The default of 0.5 or the information in the pred_weight_table applies to all bi-predicted PUs in a given slice.

Document JVET-O0047, available from http://phenix.it-sudparis.eu/jvet/doc_end_user/documents/3_Geneva/wg11/JVET-C0047-v2.zip, includes a mechanism where the weighting factors of a bi-predicted PU can be signaled in the bitstream on a PU granularity. The authors of that document demonstrate a coding efficiency gain relative to the default 0.5 weighting. Seven different weight factors can be indicated using variable length codewords. The weighting factor can be determined by the encoder based, for example, on rate-distortion optimization considerations.

SUMMARY

In an embodiment, there is provided a method for predicting a weighting factor to be applied to at least one sample in a bi-predicted Prediction Unit (PU) under reconstruction for decoding a coded video sequence, including reconstructing, from the coded video sequence, a previous weighting factor applied to a previously reconstructed PU; deriving the weighting factor to be applied to the at least one sample in the bi-predicted PU under reconstruction based on the previous weighting factor; and weighting a sample value of a sample in the bi-predicted PU under reconstruction by applying the weighting factor.

In an embodiment, there is provided a device for predicting a weighting factor to be applied to at least one sample in a bi-predicted Prediction Unit (PU) under reconstruction for decoding a coded video sequence, the device including at least one memory configured to store program code; and at least one processor configured to read the program code and operate as instructed by the program code, the program code including: reconstructing code configured to cause the at least one processor to reconstruct, from the coded video sequence, a previous weighting factor applied to a previously reconstructed PU; deriving code configured to cause the at least one processor to derive the weighting factor to be applied to the at least one sample in the bi-predicted PU under reconstruction based on the previous weighting factor; and weighting code configured to cause the at least one processor to weight a sample value of a sample in the bi-predicted PU under reconstruction by applying the weighting factor.

In an embodiment, there is provided a non-transitory computer-readable medium storing instructions, the instructions comprising: one or more instructions that, when executed by one or more processors of a device for predicting a weighting factor to be applied to at least one sample in a bi-predicted Prediction Unit (PU) under reconstruction for decoding a coded video sequence, cause the one or more processors to reconstruct, from the coded video sequence, a previous weighting factor applied to a previously reconstructed PU; derive the weighting factor to be applied to the at least one sample in the bi-predicted PU under reconstruction based on the previous weighting factor; and weight a sample value of a sample in the bi-predicted PU under reconstruction by applying the weighting factor, wherein the previously reconstructed PU comprises a first previously reconstructed PU and the previous weighting factor comprises a first previous weighting factor, and wherein the weighting factor is derived by performing linear interpolation on the first previous weighting factor and a second previous weighting factor applied to a second previously reconstructed PU, and wherein the linear interpolation is performed according to the following:

$$w=(w1*((bs-1)-p)+w2*p)/(bs-1),$$

Wherein w represents the weighting factor at a sample position p, bs represents a block size of the bi-predicted PU under reconstruction, w1 represents the first previous weighting factor, and w2 represents the second previous weighting factor.

BRIEF DESCRIPTION OF THE DRAWINGS

Further features, the nature, and various advantages of the disclosed subject matter will be more apparent from the following detailed description and the accompanying drawings in which.

PROBLEM TO BE SOLVED

Reduce coding overhead of PU based signaling of weight factors relative to the technique of JVET-00047, based on one or more of a) use of weighting information already available from the reconstruction of neighboring PUs to predict the weight factor of a current PU; and b) improved entropy coding to one or more of increase coding efficiency, reduce implementation complexity, reduce computational complexity, or reduce memory requirements; and c) calculate and use prediction weighting per sample instead of per PU.

DETAILED DESCRIPTION

Figure 1:
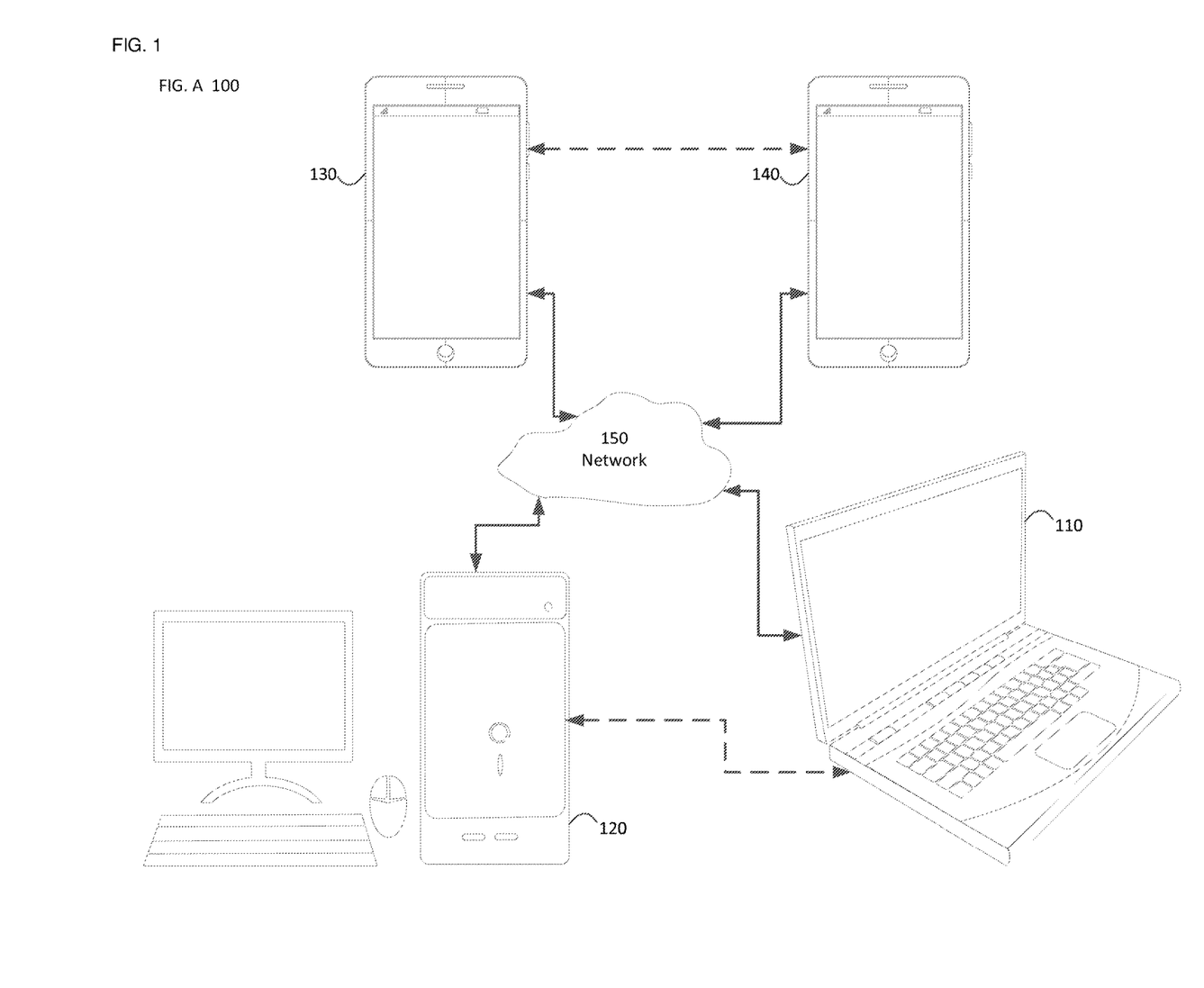
FIG. 1 is a schematic illustration of a simplified block diagram of a communication system in accordance with an embodiment.

FIG. 1 illustrates a simplified block diagram of a communication system (100) according to an embodiment of the present disclosure. The communication system (100) may include at least two terminals (110-120) interconnected via a network (150). For unidirectional transmission of data, a first terminal (110) may code video data at a local location for transmission to the other terminal (120) via the network (150). The second terminal (120) may receive the coded video data of the other terminal from the network (150), decode the coded data and display the recovered video data. Unidirectional data transmission may be common in media serving applications and the like.

FIG. 1 illustrates a second pair of terminals (130, 140) provided to support bidirectional transmission of coded video that may occur, for example, during videoconferencing. For bidirectional transmission of data, each terminal (130, 140) may code video data captured at a local location for transmission to the other terminal via the network (150). Each terminal (130, 140) also may receive the coded video data transmitted by the other terminal, may decode the coded data and may display the recovered video data at a local display device.

In FIG. 1, the terminals (110-140) may be illustrated as servers, personal computers and smart phones but the principles of the present disclosure are not so limited. Embodiments of the present disclosure find application with laptop computers, tablet computers, media players and/or dedicated video conferencing equipment. The network (150) represents any number of networks that convey coded video data among the terminals (110-140), including for example wireline and/or wireless communication networks. The communication network (150) may exchange data in circuit-switched and/or packet-switched channels. Representative networks include telecommunications networks, local area networks, wide area networks and/or the Internet. For the purposes of the present discussion, the architecture and topology of the network (150) may be immaterial to the operation of the present disclosure unless explained herein below.

Figure 2:
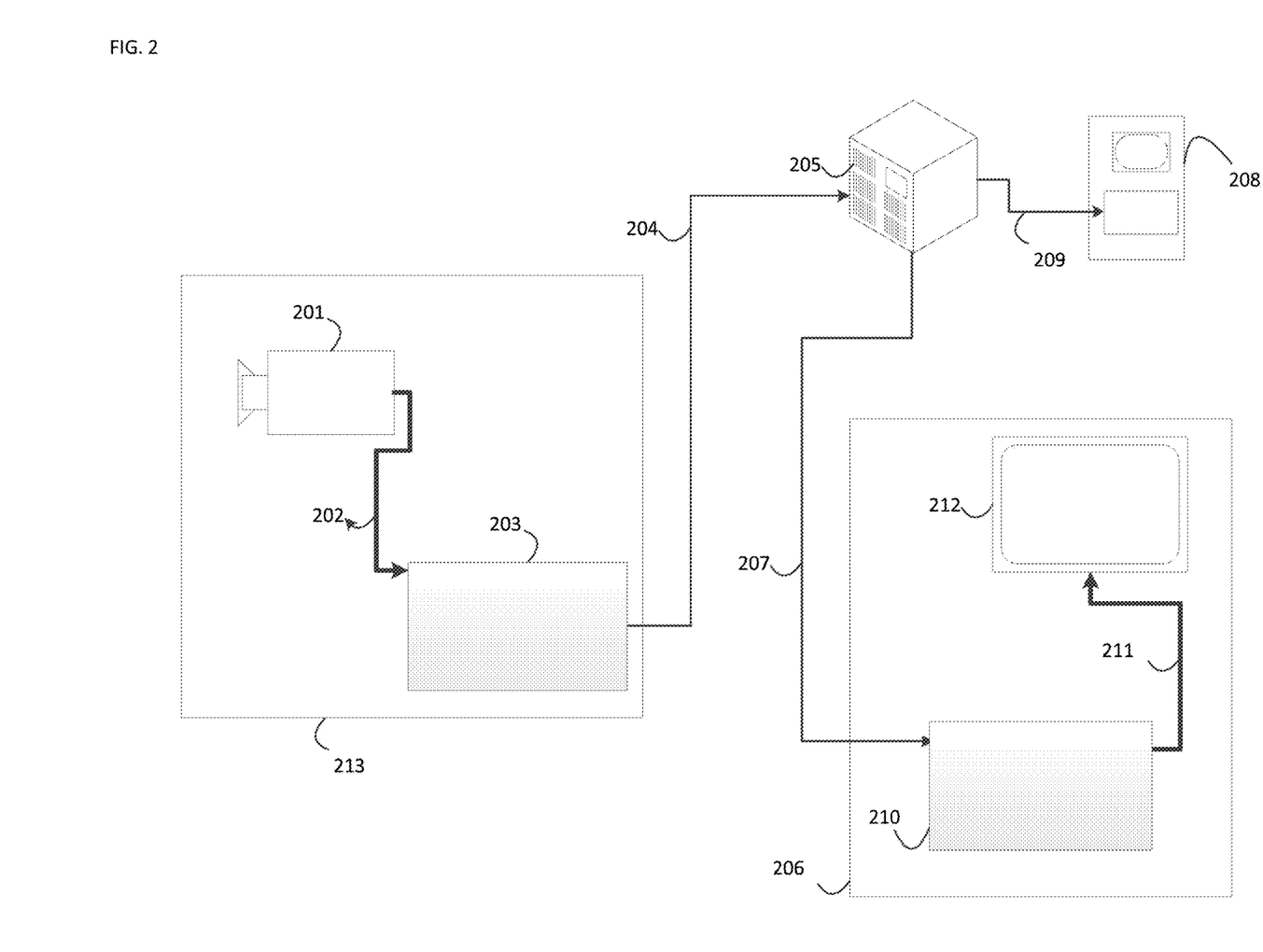
FIG. 2 is a schematic illustration of a simplified block diagram of a communication system in accordance with an embodiment.

FIG. 2 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (213), that can include a video source (201), for example a digital camera, creating, for example, an uncompressed video sample stream (202). That sample stream (202), depicted as a bold line to emphasize a high data volume when compared to encoded video bitstreams, can be processed by an encoder (203) coupled to the camera 201). The encoder (203) can include hardware, software, or a combination thereof to enable or implement aspects of the disclosed subject matter as described in more detail below. The encoded video bitstream (204), depicted as a thin line to emphasize the lower data volume when compared to the sample stream, can be stored on a streaming server (205) for future use. One or more streaming clients (206, 208) can access the streaming server (205) to retrieve copies (207, 209) of the encoded video bitstream (204). A client (206) can include a video decoder (210) which decodes the incoming copy of the encoded video bitstream (207) and creates an outgoing video sample stream (211) that can be rendered on a display (212) or other rendering device (not depicted). In some streaming systems, the video bitstreams (204, 207, 209) can be encoded according to certain video coding/compression standards. Examples of those standards include ITU-T Recommendation H.265. Under development is a video coding standard informally known as Versatile Video Coding (VVC). The disclosed subject matter may be used in the context of VVC.

Figure 3:
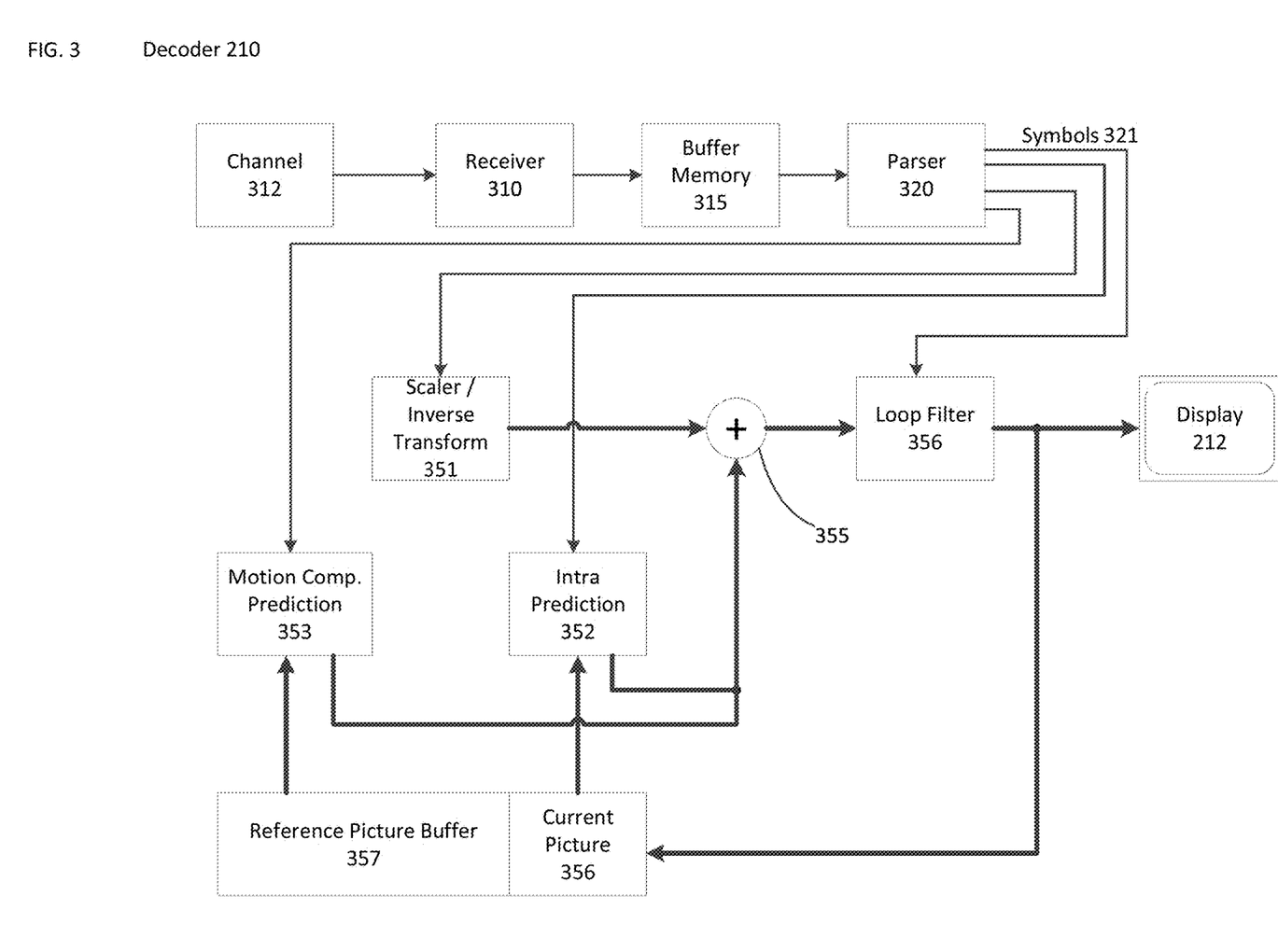
FIG. 3 is a schematic illustration of a simplified block diagram of a decoder in accordance with an embodiment.

FIG. 3 may be a functional block diagram of a video decoder (210) according to an embodiment of the present disclosure.

A receiver (310) may receive one or more codec video sequences to be decoded by the decoder (210); in the same or another embodiment, one coded video sequence at a time, where the decoding of each coded video sequence is independent from other coded video sequences. The coded video sequence may be received from a channel (312), which may be a hardware/software link to a storage device which stores the encoded video data. The receiver (310) may receive the encoded video data with other data, for example, coded audio data and/or ancillary data streams, that may be forwarded to their respective using entities (not depicted). The receiver (310) may separate the coded video sequence from the other data. To combat network jitter, a buffer memory (315) may be coupled in between receiver (310) and entropy decoder/parser (320) ("parser" henceforth). When receiver (310) is receiving data from a store/forward device of sufficient bandwidth and controllability, or from an isosychronous network, the buffer (315) may not be needed, or can be small. For use on best effort packet networks such as the Internet, the buffer (315) may be required, can be comparatively large and can advantageously of adaptive size.

The video decoder (210) may include a parser (320) to reconstruct symbols (321) from the entropy coded video sequence. Categories of those symbols include information used to manage operation of the decoder (210), and potentially information to control a rendering device such as a display (212) that is not an integral part of the decoder but can be coupled to it, as was shown in FIG. 3. The control information for the rendering device(s) may be in the form of Supplementary Enhancement Information (SEI messages) or Video Usability Information (VUI) parameter set fragments (not depicted). The parser (320) may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (320) may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter (QP) values, motion vectors, and so forth.

The parser (320) may perform entropy decoding/parsing operation on the video sequence received from the buffer (315), so to create symbols (321). The parser (320) may receive encoded data, and selectively decode particular symbols (321). Further, the parser (320) may determine whether the particular symbols (321) are to be provided to a Motion Compensation Prediction unit (353), a scaler/inverse transform unit (351), an Intra Prediction Unit (352), or a loop filter (356).

Reconstruction of the symbols (321) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (320). The flow of such subgroup control information between the parser (320) and the multiple units below is not depicted for clarity.

Beyond the functional blocks already mentioned, decoder (210) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (351). The scaler/inverse transform unit (351) receives quantized transform coefficient as well as control information, including which transform to use, block size, quantization factor, quantization scaling matrices, etc. as symbol(s) (621) from the parser (320). It can output blocks comprising sample values, that can be input into aggregator (355).

In some cases, the output samples of the scaler/inverse transform (351) can pertain to an intra coded block; that is: a block that is not using predictive information from previously reconstructed pictures, but can use predictive information from previously reconstructed parts of the current picture. Such predictive information can be provided by an intra picture prediction unit (352). In some cases, the intra picture prediction unit (352) generates a block of the same size and shape of the block under reconstruction, using surrounding already reconstructed information fetched from the current (partly reconstructed) picture (356). The aggregator (355), in some cases, adds, on a per sample basis, the prediction information the intra prediction unit (352) has generated to the output sample information as provided by the scaler/inverse transform unit (351).

In other cases, the output samples of the scaler/inverse transform unit (351) can pertain to an inter coded, and potentially motion compensated block. In such a case, a Motion Compensation Prediction unit (353) can access reference picture memory (357) to fetch samples used for prediction. After motion compensating the fetched samples in accordance with the symbols (321) pertaining to the block, these samples can be added by the aggregator (355) to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols (321) that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator (355) can be subject to various loop filtering techniques in the loop filter unit (356). Video compression technologies can include in-loop filter technologies that are controlled by parameters included in the coded video bitstream and made available to the loop filter unit (356) as symbols (321) from the parser (320), but can also be responsive to meta-information obtained during the decoding of previous (in decoding order) parts of the coded picture or coded video sequence, as well as responsive to previously reconstructed and loop-filtered sample values.

The output of the loop filter unit (356) can be a sample stream that can be output to the render device (212) as well as stored in the reference picture memory (356) for use in future inter-picture prediction.

Certain coded pictures, once fully reconstructed, can be used as reference pictures for future prediction. Once a coded picture is fully reconstructed and the coded picture has been identified as a reference picture (by, for example, parser (320)), the current reference picture (656) can become part of the reference picture buffer (357), and a fresh current picture memory can be reallocated before commencing the reconstruction of the following coded picture.

The video decoder (210) may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (310) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or signal-to-noise ratio (SNR) enhancement layers, redundant slices, redundant pictures, forward error correction codes, and so on.

Figure 4:
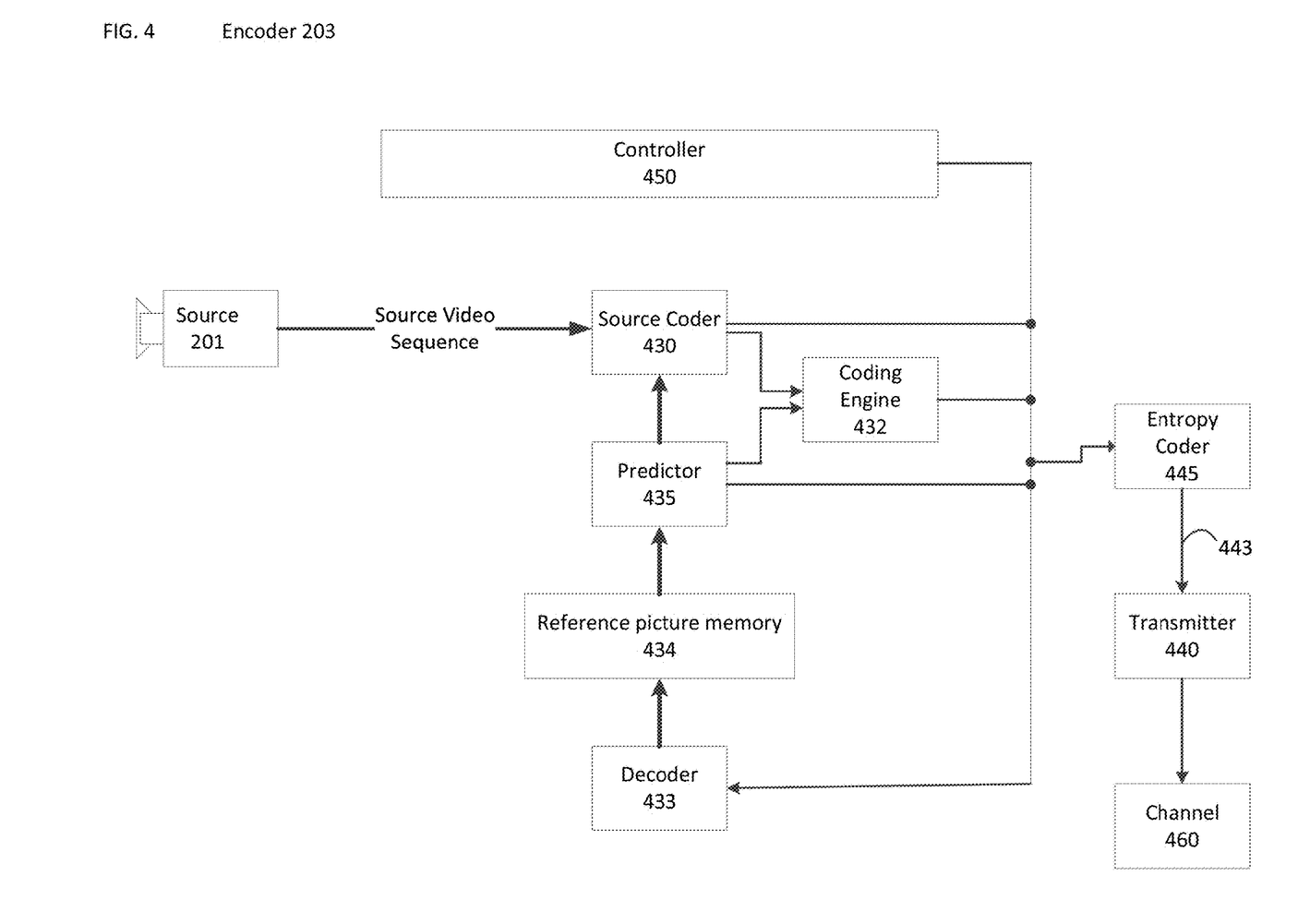
FIG. 4 is a schematic illustration of a simplified block diagram of an encoder in accordance with an embodiment.

FIG. 6 may be a functional block diagram of a video encoder (203) according to an embodiment of the present disclosure.

The encoder (203) may receive video samples from a video source (201) (that is not part of the encoder) that may capture video image(s) to be coded by the encoder (203).

The video source (201) may provide the source video sequence to be coded by the encoder (203) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (201) may be a storage device storing previously prepared video. In a videoconferencing system, the video source (203) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the encoder (203) may code and compress the pictures of the source video sequence into a coded video sequence (443) in real time or under any other time constraints as required by the application. Enforcing appropriate coding speed is one function of Controller (450). Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller (450) as they may pertain to video encoder (203) optimized for a certain system design.

Some video encoders operate in what a person skilled in the art readily recognizes as a "coding loop." As an oversimplified description, a coding loop can consist of the encoding part of an encoder (430) ("source coder" henceforth) (responsible for creating symbols based on an input picture to be coded, and a reference picture(s)), and a (local) decoder (433) embedded in the encoder (203) that reconstructs the symbols to create the sample data that a (remote) decoder also would create (as any compression between symbols and coded video bitstream is lossless in the video compression technologies considered in the disclosed subject matter). That reconstructed sample stream is input to the reference picture memory (434). As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder (433) can be the same as of a "remote" decoder (210), which has already been described in detail above in conjunction with FIG. 3. Briefly referring also to FIG. 6, however, as symbols are available and en/decoding of symbols to a coded video sequence by entropy coder (445) and parser (320) can be lossless, the entropy decoding parts of decoder (210), including channel (312), receiver (310), buffer (315), and parser (320) may not be fully implemented in local decoder (433).

An observation that can be made at this point is that any decoder technology except the parsing/entropy decoding that is present in a decoder also necessarily needs to be present, in substantially identical functional form, in a corresponding encoder. The description of encoder technologies can be abbreviated as they are the inverse of the comprehensively described decoder technologies. Only in certain areas a more detail description is required and provided below.

As part of its operation, the source coder (430) may perform motion compensated predictive coding, which codes an input frame predictively with reference to one or more previously-coded frames from the video sequence that were designated as "reference frames." In this manner, the coding engine (432) codes differences between pixel blocks of an input frame and pixel blocks of reference frame(s) that may be selected as prediction reference(s) to the input frame.

The local video decoder (433) may decode coded video data of frames that may be designated as reference frames, based on symbols created by the source coder (430). Operations of the coding engine (432) may advantageously be lossy processes. When the coded video data may be decoded at a video decoder (not shown in FIG. 6), the reconstructed video sequence typically may be a replica of the source video sequence with some errors. The local video decoder (433) replicates decoding processes that may be performed by the video decoder on reference frames and may cause reconstructed reference frames to be stored in the reference picture cache (434). In this manner, the encoder (203) may store copies of reconstructed reference frames locally that have common content as the reconstructed reference frames that will be obtained by a far-end video decoder (absent transmission errors).

The predictor (435) may perform prediction searches for the coding engine (432). That is, for a new frame to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures. The predictor (435) may operate on a sample block-by-pixel block basis to find appropriate prediction references. In some cases, as determined by search results obtained by the predictor (435), an input picture may have prediction references drawn from multiple reference pictures stored in the reference picture memory (434).

The controller (450) may manage coding operations of the video coder (430), including, for example, setting of parameters and subgroup parameters used for encoding the video data.

Output of all aforementioned functional units may be subjected to entropy coding in the entropy coder (445). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (440) may buffer the coded video sequence(s) as created by the entropy coder (445) to prepare it for transmission via a communication channel (460), which may be a hardware/software link to a storage device which would store the encoded video data. The transmitter (440) may merge coded video data from the video coder (430) with other data to be transmitted, for example, coded audio data and/or ancillary data streams (sources not shown).

The controller (450) may manage operation of the encoder (203). During coding, the controller (450) may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (203) may perform coding operations according to a predetermined video coding technology or standard, such as ITU-T Rec. H.265. In its operation, the video coder (203) may perform various compression operations, including predictive coding operations that exploit temporal and spatial redundancies in the input video sequence. The coded video data, therefore, may conform to a syntax specified by the video coding technology or standard being used.

In an embodiment, the transmitter (440) may transmit additional data with the encoded video. The video coder (430) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on. The disclosed subject matter relates to inter picture prediction, and the reconstruction of bi-predicted prediction units (PUs).

The per PU based signaling of JVET-O0047 codes, for each bi-predicted PU in a picture, a codeword containing a weighting factor. The weighting factor is coded in accordance with two fixed tables ("Scheme #1", and "Scheme #2" in Table 1 of JVET-O0047). The binarized codeword is used as input into standard CABAC processing as available in H.264, H.265, and HEVC. No prediction is used for the coding of the weighting factors. The lack of prediction can be detrimental to the coding efficiency, and the use of potentially relatively large codewords as input to CABAC processing can have architectural disadvantages such as high memory and computational requirements and high implementation complexity. The disclosed subject matter addresses these shortcomings.

In an embodiment, the weighting factor of a PU under reconstruction is determined by combining a weighting factor offset, that can be zero, and zero, one or more weighting factors available from a previously reconstructed PU (weighting factor prediction).

In the same or another embodiment, when there is no weighting factor available from a previously reconstructed PU, the weighting factor offset becomes the weighting factor.

In the same or another embodiment, a video coding technology or standard can allow or disallow, for certain syntax structures such as PUs, slices, tiles, coded pictures, groups of coded pictures, coded video sequences, and so forth, the use weighting factors from previously reconstructed PUs as predictors for a PU under reconstruction.

In the same or another embodiment, a value of the codeword or a second codeword, for example a single bit, can be used to indicate whether spatial weighting factor prediction is used.

In the same or another embodiment, the weighting factor offset can be coded as a fixed length binary codeword of, for example, three bits.

In the same or another embodiment, the weighting factor offset can be coded as a variable length codeword using techniques such as Huffman coding. The assignment of the weighting factor to a codeword can be static.

In the same or another embodiment, the assignment of the weighting factor to a codeword can be dynamic and, for example, based on use statistics of PUs preceding the current PU in decoding order.

Figure 5:
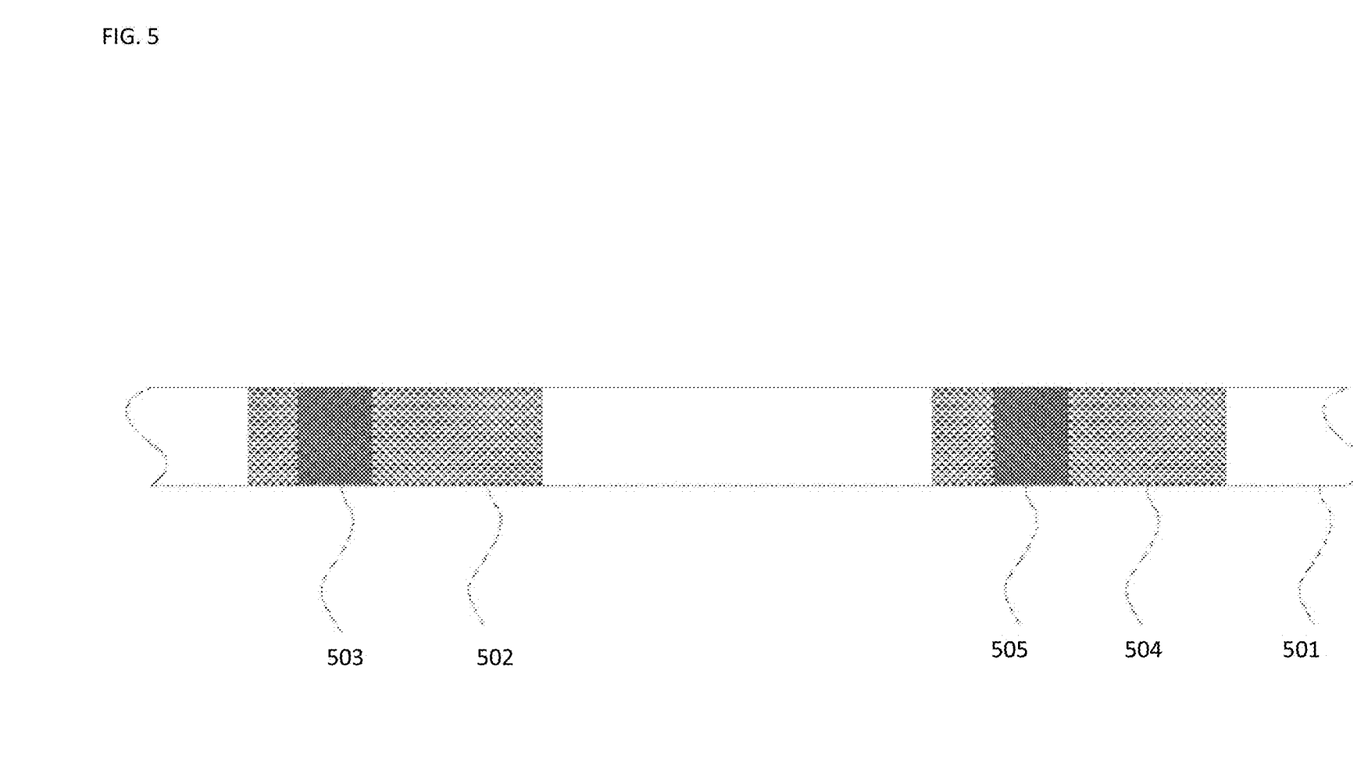
FIG. 5 is a schematic illustration of a coded video sequence including coded PUs including coded weighting factors in accordance with an embodiment.
Figure 6:
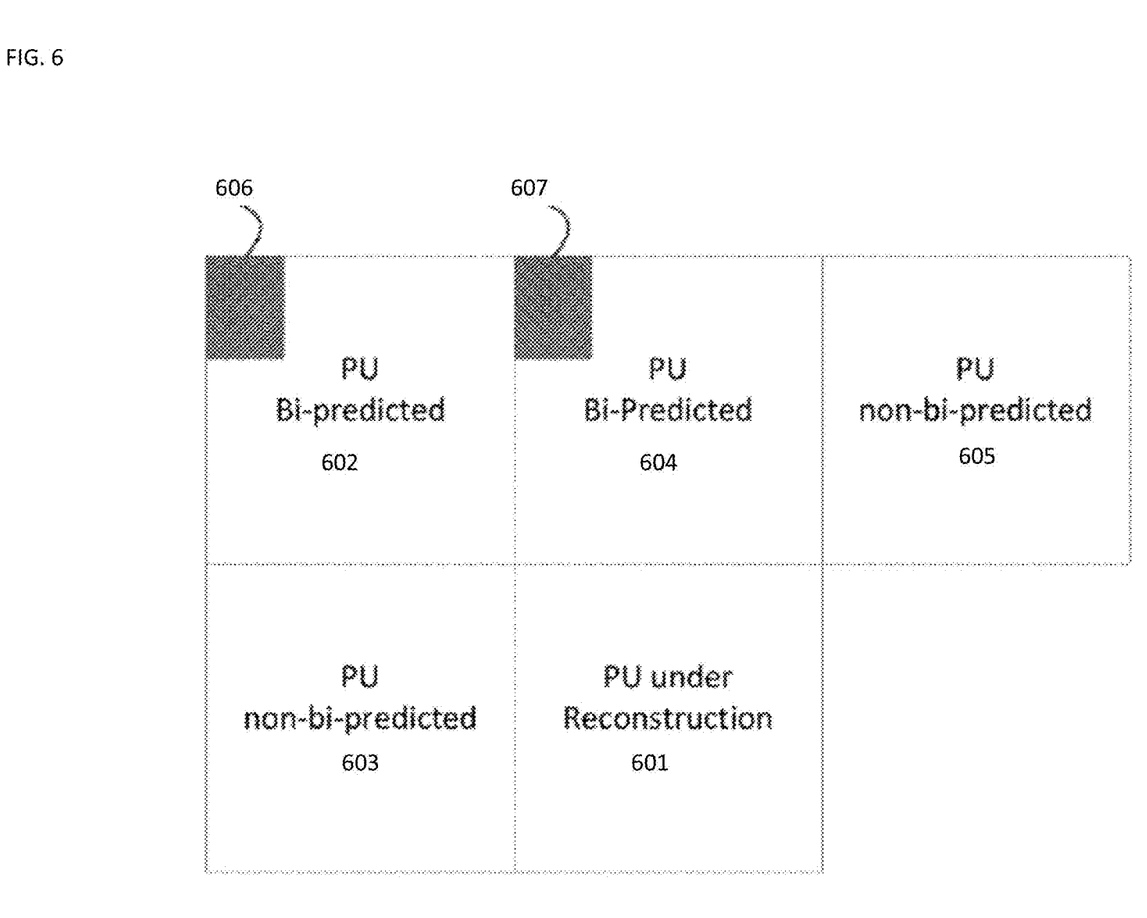
FIG. 6 is a schematic illustration of weighting factor prediction of a PU in the spatial domain in accordance with an embodiment.

FIG. 5 and FIG. 6 shows a first and second example of weighting factor offset prediction. Other options than the two examples are also possible. For example, a weighting factor could be predicted from the spatially co-located PU of the previous decoded picture (temporal prediction).

Referring to FIG. 5, in a first, simple example, the weighting factor offset can be predicted using the weighting factor offset of the previous bi-predicted PU in decoding order. Shown is a coded video sequence (501) that includes two bi-predicted PUs (502, 504). No other bi-predicted PU is located in the coded video sequence between PUs (502) and (504). In PU (502), there is a weighting factor offset (503) coded in suitable form, for example as a fixed or variable length codeword or a symbol coded using CABAC (see below for additional discussion about the coding of weighting factor offsets). The second PU (504) also includes a weighting factor offset (505). The weighting factor for the reconstruction of the second PU (504) can be calculated by using the weighting factor of the first PU (502) as a predictor, and by adding the weighting factor offset (505) of the second PU (504). Such simple form of bitstream-order prediction has the advantage of simple implementation and low memory requirements. However, in some cases, more advanced spatial prediction techniques can yield better coding efficiency.

Referring to FIG. 6, shown is a PU under reconstruction (601) in the spatial domain. Surrounding the PU under reconstruction but preceding it in decoding order, are four more PUs (602 through 605). Each of these PUs may be bi-predicted, and if it were, it may have a weighting factor associated with it. In the example, PUs (602) and (604) are assumed to be bi-predicted and therefore may have associated weighting factors (606, 607), whereas PUs (603) and (605) may be coded using a different coding mode (such as: P prediction, intra, . . . ) that may have no associated weighting factor.

In the same or another embodiment, weighting factors (606, 607) of spatially neighboring, bi-predicted PUs such as PUs (603, 604) can be used as predictors for the PU under reconstruction (601). The available weighting factors of neighboring PUs (here: weighting factors (606, 607) and PUs (603, 604)) can, for example be used based on a static pre-determined order that may be mandated by a video coding technology or standard, or may be coded in high level syntax such as a parameter set. For example, such an order could be (602)-(603)-(604)-(605). The first available weighting factor in accordance with the order could be the weighting factor used for prediction. In the example of FIG. 6, the first PU in order (602) is not bi-predicted and has, therefore, no weighting factor associated with it. Accordingly, the weighting factor (606) of the next PU (603) in order can be used for weighting factor prediction of the PU under reconstruction (601).

In the same or another embodiment, the available weighting factors of neighboring PUs could be used in combination, for example by averaging. In the example of FIG. 6, that would result the weighting factor predictor for PU under reconstruction (601) being the average, suitably rounded, of the weighting factors of PUs (603) and (604).

In the same or another embodiment, a video coding technology or standard, or one or more a high level syntax elements, can specify more complex (compared to averaging) combinations of available weighting factors.

In the same or another embodiment, once a prediction weighting factor has been derived, for example by the mechanisms described above or by inferring a fixed value of a prediction weighting factor of, for example, 0.5 due to lack of suitable and available prediction weighting factors, the prediction weighting for the reconstruction of the PU can be computed using, for example, a weighting factor offset. Such computation can be an addition, a table lookup, or any other suitable operation. In some cases, the operation can be followed by rounding.

In FIG. 6, the PUs are all depicted as of square shape and of equal size. In the same or another embodiment, however, relevant prediction units can be of non-square shapes and of unequal sizes. In that, the prediction of weighting factors follows principles readily understood by a person skilled in the art, as they are known from, for example, H.265.

Similarly, in the same or another embodiment, nothing in this disclosure should prevent the prediction of weighting factors from PUs that are not direct spatial neighbors of the PU under reconstruction.

So far, the description of the disclosed subject matter has not elaborated on the details of the coding of the weighting factor offsets in the bitstream.

In the same or another embodiment, the weighting factor offsets are coded as a fixed length, binary coded unsigned integer. As an example, weighting factors could be coded as shown in Table 1:

TABLE 1

| Weighting factor offset value | Weight |
|---|---|
| 0 | −1/4 |
| 1 | 1/4 |

TABLE 1-continued

| Weighting factor offset value | Weight |
|---|---|
| 2 | 3/8 |
| 3 | 1/2 |
| 4 | 5/8 |
| 5 | 3/4 |
| 6 | 5/7 |
| 7 | unassigned |

Other weight to weight factor offset tables can be devised by a person skilled in the art, trading off, for example, the number of bits used for signaling the weighting factor offset and the granularity of the weighting. For example, a four bit weighting factor offset value would allow for up to 16 suitably chosen weighting factors.

In the same or another embodiment, a variable length codeword can be used that can be input to CABAC processing as known from, for example, H.265. Doing so can have, for some content, the advantage of better coding efficiency, but can also incur additional implementation complexity as well as storage requirements (for the up to five CABAC bins).

In the same or another embodiment, a variable length codeword can be included in the bitstream that is not CABAC coded. The assignment of that codeword to the weight can be static. While easy to implement and, for some content, more efficient than the fixed length coding mechanism described above, the coding efficiency may be suboptimal for other content. A content adaptive mechanism is, in some cases desirable.

So far, described were the mechanisms to derive a single weighting factor, applicable to a single PU. For small PUs of, for example 4×4 samples, such mechanisms can be a good compromise between implementation complexity and performance. However, for larger PU sizes, for example 64×64 samples, further improvements can be desirable. The above mechanisms can be improved, according to the same or another embodiment, by using different weighting factors for the different samples or sub-blocks of a PU. In the same or another embodiment, per sample weighting factors can be realized without the coding of additional syntax elements, thereby potentially improving the rate-distortion performance.

Figure 7:
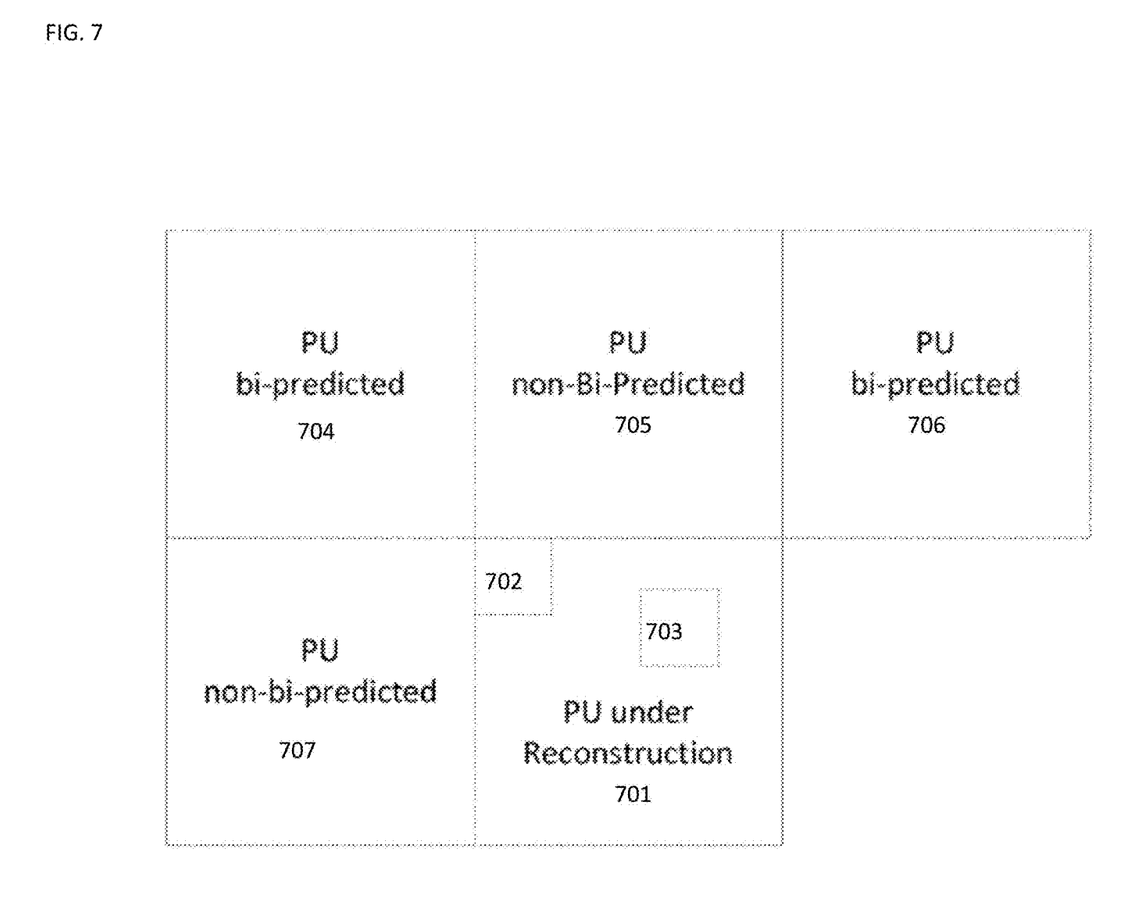
FIG. 7 is a schematic illustration of weighting factor prediction of samples of a PU in the spatial domain in accordance with an embodiment.

Referring to FIG. 7, consider a PU under reconstruction (701) includes 4×4 samples. For clarity, only two samples (702, 703) of those 16 samples are shown, and they are depicted slightly larger than what they were if drawn in proportion to the PU size. Sample (702) is located in the in the upper left corner of the PU (701) under reconstruction, and sample (703) is located in the second row of samples and in the thirdmost column counting from the left.

In the depicted example, PU (701) under reconstruction has four neighboring PUs that precede it in decoding order, two of which (704, 706) are assumed to be bi-predicted and include weighting factors, and two PUs (705, 707) which is not bi-predicted and assumed not to contain a weighting factor. When following the previously described mechanisms, out of the two PUs (704, 706) including weight factors a single weight factor would be derived that would be applied equally to all samples of the PU (701) under reconstruction, including samples (702) and (703).

In the same or another embodiment, however, the two available weight factors in the example are simultaneously employed to calculate the weight factor for each sample of the PU under reconstruction (701) individually. In the same or another embodiment, linear interpolation is used to calculate the weighting factor values.

As an example, consider the weighting factor as obtained by any of the above mechanisms for PU (704) to be ⅛, and the weighting factor for PU (706) to be ⅜. Sample (702) can, in this case, have a weight factor of ⅛, calculated as (⅛*(3-0)+⅜*0)/4. Sample (703), can, in the same case, have a weight factor of ⅛+1/12=5/24, calculated as (⅛ *(3−2)+⅜*(3−1))/3.

To generalize this one-dimensional linear interpolation example:

Let p be the position of a sample in a given dimension $0<=p<bs$, wherein bs is the block size in this dimension in units of samples. Further let w1 be the weight factor of the PU (704) to the left of the PU (701) under reconstruction, and let w2 be the weight factor of the PU (706) to the right of the PU (701) under reconstruction.

The weight factor at sample position p can be calculated as $(w1*((bs-1)-p)+w2*p)/(bs-1)$ A person skilled in the art can readily extent this one-dimensional linear interpolation into a two-dimensional linear interpolation. A person skilled in the art can also readily extent the interpolation to take into account more than two weight factors and their spatial positions relative to the sample under reconstruction.

Figure 8:
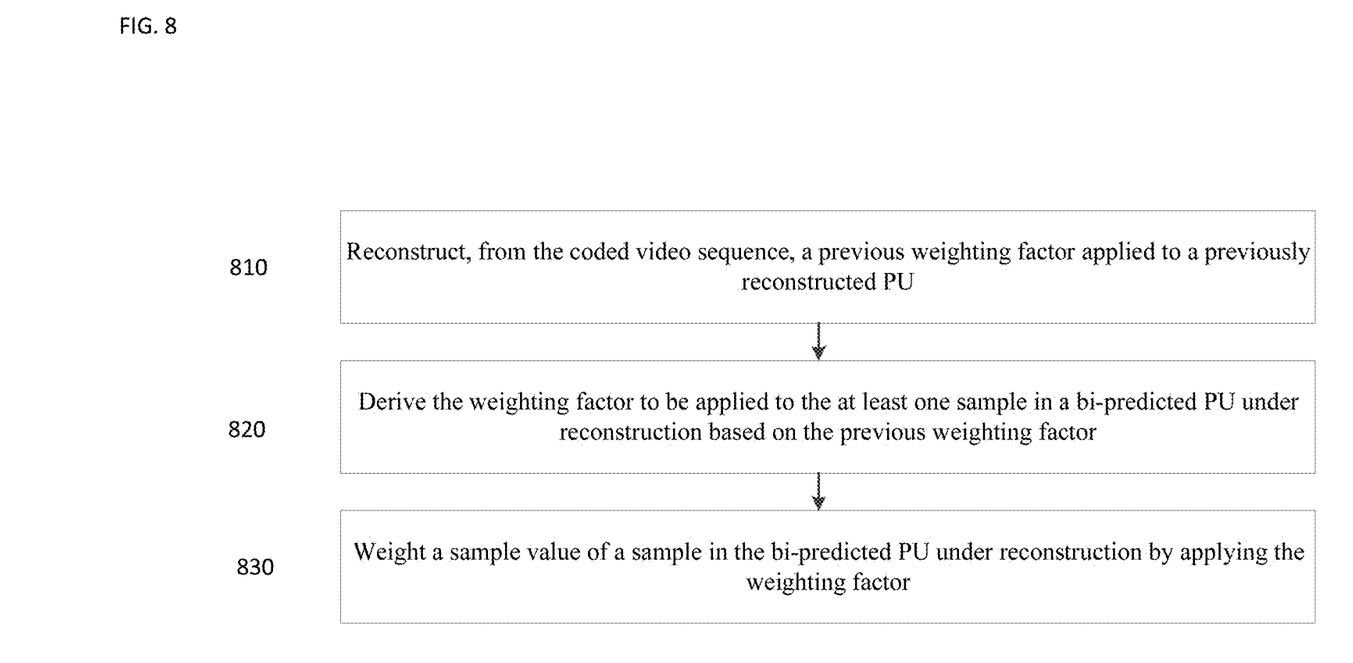
FIG. 8 is a flowchart of an example process for predicting a weighting factor to be applied to at least one sample in a bi-predicted Prediction Unit (PU) under reconstruction for decoding a coded video sequence

FIG. 8 is a flowchart is a flowchart of an example process 800 for predicting a weighting factor to be applied to at least one sample in a bi-predicted PU under reconstruction for decoding a coded video sequence. In some implementations, one or more process blocks of FIG. 8 may be performed by decoder 210. In some implementations, one or more process blocks of FIG. 8 may be performed by another device or a group of devices separate from or including decoder 210, such as encoder 203.

As shown in FIG. 8, process 800 may include reconstructing, from the coded video sequence, a previous weighting factor applied to a previously reconstructed PU (block 810).

As further shown in FIG. 8, process 800 may include deriving the weighting factor to be applied to the at least one sample in a bi-predicted PU under reconstruction based on the previous weighting factor (block 820).

As further shown in FIG. 8, process 800 may include weighting a sample value of a sample in the bi-predicted PU under reconstruction by applying the weighting factor (block 830).

In an embodiment, the process further includes deriving the weighting factor by combining the previous weighting factor with a weighting factor offset.

In an embodiment, the weighting factor offset is coded in the coded video sequence using a fixed-length binary codeword.

In an embodiment, the weighting factor offset is coded in the coded video sequence using a variable length codeword.

In an embodiment, the weighting factor offset is determined based on use statistics of PUs preceding the bi-predicted PU under reconstruction.

In an embodiment, the previously reconstructed PU comprises a bi-predicted PU that immediately precedes the bi-predicted PU under reconstruction in a decoding order of the coded video sequence.

In an embodiment, the previously reconstructed PU comprises a bi-predicted PU that spatially neighbors the bi-predicted PU under reconstruction.

In an embodiment, the previously reconstructed PU comprises a bi-predicted PU that is spatially co-located with the bi-predicted PU under reconstruction in a previously decoded picture.

In an embodiment, the previously reconstructed PU comprises a first previously reconstructed PU and the previous weighting factor comprises a first previous weighting factor, wherein weighting factor is derived by performing linear interpolation on the first previous weighting factor and a second previous weighting factor applied to a second previously reconstructed PU.

In an embodiment, the linear interpolation is performed according to the following:

$$w=(w1*((bs-1)-p)+w2*p)/(bs-1),$$

wherein w represents the weighting factor at a sample position p, bs represents a block size of the bi-predicted PU under reconstruction, w1 represents the first previous weighting factor, and w2 represents the second previous weighting factor Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

Further, the proposed methods may be implemented by processing circuitry (e.g., one or more processors or one or more integrated circuits). In one example, the one or more processors execute a program that is stored in a non-transitory computer-readable medium to perform one or more of the proposed methods.

The techniques for signaling prediction weights in video coding described above, can be implemented as computer software using computer-readable instructions and physically stored in one or more computer-readable media. For example, FIG. 9 shows a computer system 900 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 9:
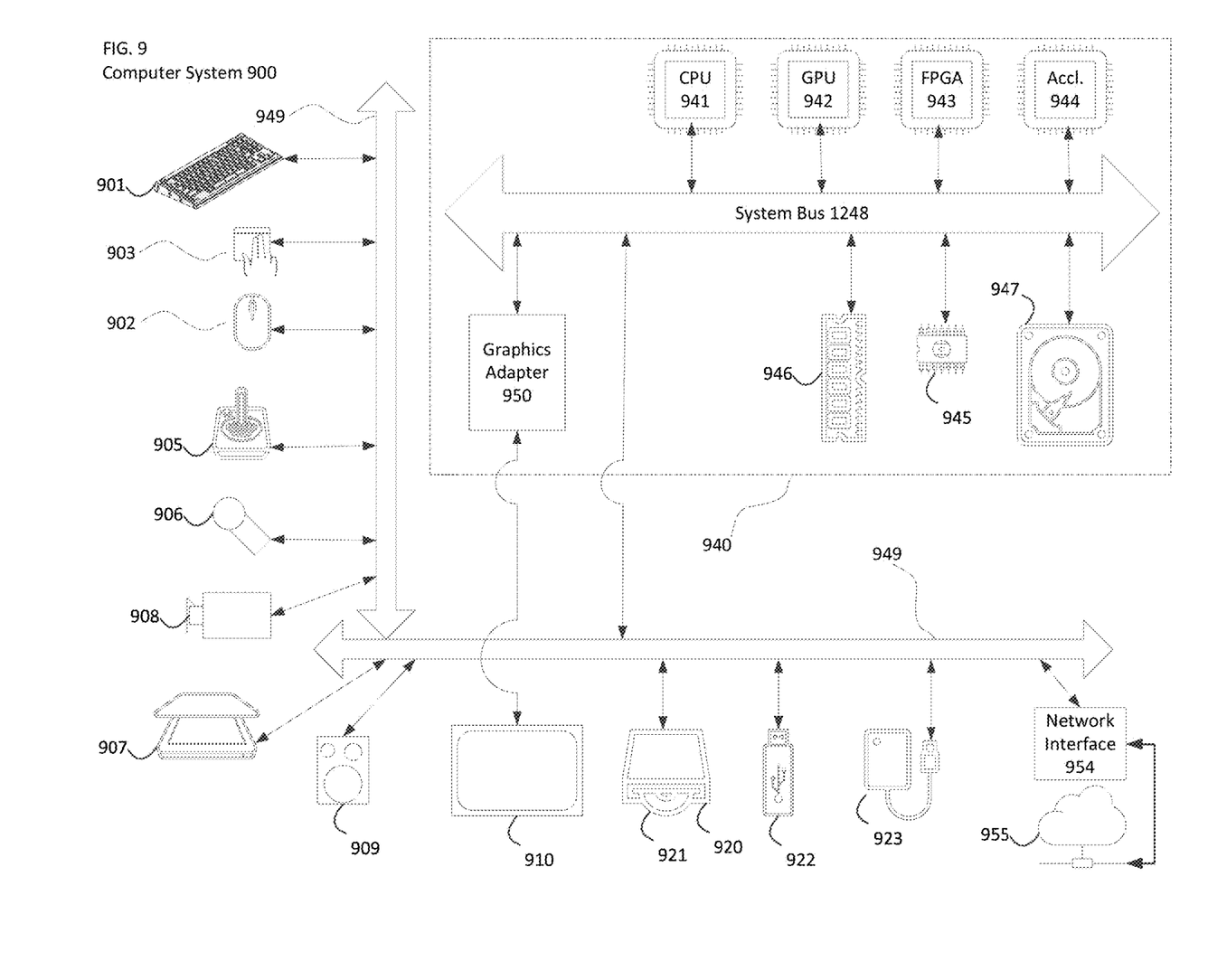
FIG. 9 is a schematic illustration of a computer system in accordance with an embodiment.

The components shown in FIG. 9 for computer system 900 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 900.

Computer system 900 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 901, mouse 902, trackpad 903, touch screen 910, data-glove 904, joystick 905, microphone 906, scanner 907, camera 908.

Computer system 900 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 910, data-glove 904, or joystick 905, but there can also be tactile feedback devices that do not serve as input devices), audio output devices (such as: speakers 909, headphones (not depicted)), visual output devices (such as screens 910 to include cathode ray tube (CRT) screens, liquid-crystal display (LCD) screens, plasma screens, organic light-emitting diode (OLED) screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 900 can also include human accessible storage devices and their associated media such as optical media including CD/DVD ROM/RW 920 with CD/DVD or the like media 921, thumb-drive 922, removable hard drive or solid state drive 923, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 900 can also include interface(s) to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include global systems for mobile communications (GSM), third generation (3G), fourth generation (4G), fifth generation (5G), Long-Term Evolution (LTE), and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (949) (such as, for example universal serial bus (USB) ports of the computer system 900; others are commonly integrated into the core of the computer system 900 by attachment to a system bus as described below (for example Ethernet interface into a PC computer system or cellular network interface into a smartphone computer system). Using any of these networks, computer system 900 can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 940 of the computer system 900.

The core 940 can include one or more Central Processing Units (CPU) 941, Graphics Processing Units (GPU) 942, specialized programmable processing units in the form of Field Programmable Gate Areas (FPGA) 943, hardware accelerators for certain tasks 944, and so forth. These devices, along with Read-only memory (ROM) 945, Random-access memory (RAM) 946, internal mass storage such as internal non-user accessible hard drives, solid-state drives (SSDs), and the like 947, may be connected through a system bus 948. In some computer systems, the system bus 948 can be accessible in the form of one or more physical plugs to enable extensions by additional CPUs, GPU, and the like. The peripheral devices can be attached either directly to the core's system bus 948, or through a peripheral bus 949. Architectures for a peripheral bus include peripheral component interconnect (PCI), USB, and the like.

CPUs 941, GPUs 942, FPGAs 943, and accelerators 944 can execute certain instructions that, in combination, can make up the aforementioned computer code. That computer code can be stored in ROM 945 or RAM 946. Transitional data can be also be stored in RAM 946, whereas permanent data can be stored for example, in the internal mass storage 947. Fast storage and retrieve to any of the memory devices can be enabled through the use of cache memory, that can be closely associated with one or more CPU 941, GPU 942, mass storage 947, ROM 945, RAM 946, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 900, and specifically the core 940 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 940 that are of non-transitory nature, such as core-internal mass storage 947 or ROM 945. The software implementing various embodiments of the present disclosure can be stored in such devices and executed by core 940. A computer-readable medium can include one or more memory devices or chips, according to particular needs. The software can cause the core 940 and specifically the processors therein (including CPU, GPU, FPGA, and the like) to execute particular processes or particular parts of particular processes described herein, including defining data structures stored in RAM 946 and modifying such data structures according to the processes defined by the software. In addition or as an alternative, the computer system can provide functionality as a result of logic hardwired or otherwise embodied in a circuit (for example: accelerator 944), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

The invention claimed is:

1. A method for predicting a weighting factor to be applied to at least one sample in a bi-predicted Prediction Unit (PU) under reconstruction for decoding a coded video sequence, the method comprising:
   reconstructing, from the coded video sequence, a previous weighting factor applied to a previously reconstructed PU;
   deriving the weighting factor to be applied to the at least one sample in the bi-predicted PU under reconstruction based on the previous weighting factor; and
   weighting a sample value of a sample in the bi-predicted PU under reconstruction by applying the weighting factor,
   wherein the previously reconstructed PU comprises a first previously reconstructed PU and the previous weighting factor comprises a first previous weighting factor, and
   wherein the weighting factor is derived by performing linear interpolation on the first previous weighting factor and a second previous weighting factor applied to a second previously reconstructed PU.

2. The method of claim 1, further comprising deriving the weighting factor by combining the previous weighting factor with a weighting factor offset.

3. The method of claim 2, wherein the weighting factor offset is coded in the coded video sequence using a fixed-length binary codeword.

4. The method of claim 2, wherein the weighting factor offset is coded in the coded video sequence using a variable length codeword.

5. The method of claim 2, wherein the weighting factor offset is determined based on use statistics of PUs preceding the bi-predicted PU under reconstruction.

6. The method of claim 1, wherein the previously reconstructed PU comprises a bi-predicted PU that immediately precedes the bi-predicted PU under reconstruction in a decoding order of the coded video sequence.

7. The method of claim 1, wherein the previously reconstructed PU comprises a bi-predicted PU that spatially neighbors the bi-predicted PU under reconstruction.

8. The method of claim 1, wherein the previously reconstructed PU comprises a bi-predicted PU that is spatially co-located with the bi-predicted PU under reconstruction in a previously decoded picture.

9. The method of claim 1, wherein the linear interpolation is performed according to the following:

$$w=(w1*((bs-1)-p)+w2*p)/(bs-1),$$

wherein w represents the weighting factor at a sample position p, bs represents a block size of the bi-predicted PU under reconstruction, w1 represents the first previous weighting factor, and w2 represents the second previous weighting factor.

10. A device for predicting a weighting factor to be applied to at least one sample in a bi-predicted Prediction Unit (PU) under reconstruction for decoding a coded video sequence, the device comprising:

at least one memory configured to store program code; and at least one processor configured to read the program code and operate as instructed by the program code, the program code including:

reconstructing code configured to cause the at least one processor to reconstruct, from the coded video sequence, a previous weighting factor applied to a previously reconstructed PU;

deriving code configured to cause the at least one processor to derive the weighting factor to be applied to the at least one sample in the bi-predicted PU under reconstruction based on the previous weighting factor; and weighting code configured to cause the at least one processor to weight a sample value of a sample in the bi-predicted PU under reconstruction by applying the weighting factor, wherein the previously reconstructed PU comprises a first previously reconstructed PU and the previous weighting factor comprises a first previous weighting factor, and wherein the weighting factor is derived by performing linear interpolation on the first previous weighting factor and a second previous weighting factor applied to a second previously reconstructed PU.

11. The device of claim 10, wherein the deriving code is further configured to cause the at least one processor to derive the weighting factor by combining the previous weighting factor with a weighting factor offset.

12. The device of claim 11, wherein the weighting factor offset is coded in the coded video sequence using a fixed-length binary codeword.

13. The device of claim 11, wherein the weighting factor offset is coded in the coded video sequence using a variable length codeword.

14. The device of claim 11, wherein the weighting factor offset is determined based on use statistics of PUs preceding the bi-predicted PU under reconstruction.

15. The device of claim 10, wherein the previously reconstructed PU comprises a bi-predicted PU that immediately precedes the bi-predicted PU under reconstruction in a decoding order of the coded video sequence.

16. The device of claim 10, wherein the previously reconstructed PU comprises a bi-predicted PU that spatially neighbors the bi-predicted PU under reconstruction.

17. The device of claim 10, wherein the linear interpolation is performed according to the following:

$$w=(w1*((bs-1)-p)+w2*p)/(bs-1),$$

wherein w represents the weighting factor at a sample position p, bs represents a block size of the bi-predicted PU under reconstruction, w1 represents the first previous weighting factor, and w2 represents the second previous weighting factor.

18. A non-transitory computer-readable medium storing instructions, the instructions comprising: one or more instructions that, when executed by one or more processors of a device for predicting a weighting factor to be applied to at least one sample in a bi-predicted Prediction Unit (PU) under reconstruction for decoding a coded video sequence, cause the one or more processors to:

reconstruct, from the coded video sequence, a previous weighting factor applied to a previously reconstructed PU;

derive the weighting factor to be applied to the at least one sample in the bi-predicted PU under reconstruction based on the previous weighting factor; and weight a sample value of a sample in the bi-predicted PU under reconstruction by applying the weighting factor, wherein the previously reconstructed PU comprises a first previously reconstructed PU and the previous weighting factor comprises a first previous weighting factor, and wherein the weighting factor is derived by performing linear interpolation on the first previous weighting factor and a second previous weighting factor applied to a second previously reconstructed PU, and wherein the linear interpolation is performed according to the following:

$$w=(w1*((bs-1)-p)+w2*p)/(bs-1),$$

wherein w represents the weighting factor at a sample position p, bs represents a block size of the bi-predicted PU under reconstruction, w1 represents the first previous weighting factor, and w2 represents the second previous weighting factor.

* * * * *